R. STRICKLAND.
Coffee and Tea Pot.
No. 84,018.  Patented Nov. 10, 1868.
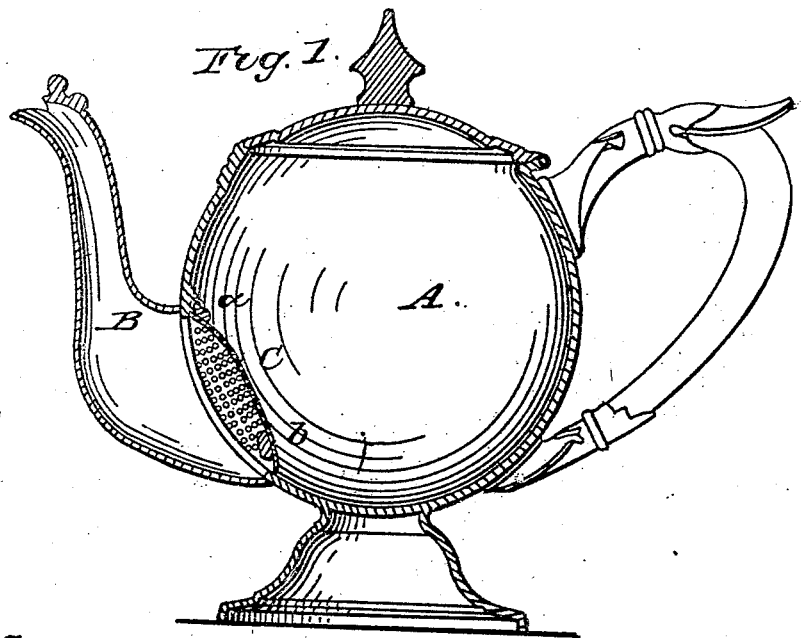
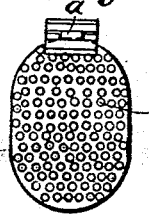
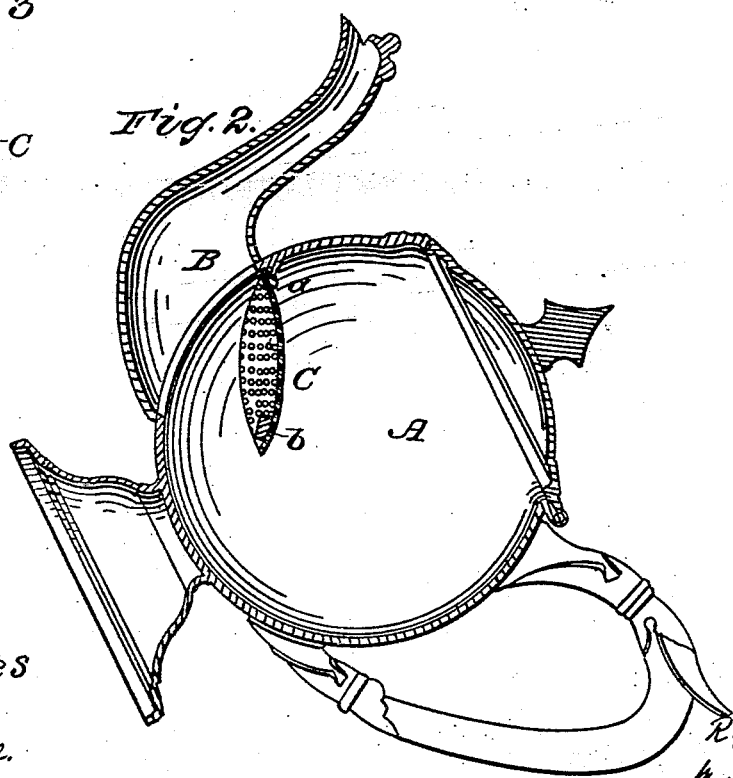
witnesses
Inventor

R. STRICKLAND, OF ALBANY, NEW YORK.

Letters Patent No. 84,018, dated November 10, 1868.

IMPROVEMENT IN COFFEE AND TEA-POTS.

The Schedule referred to in these Letters Patent and making part of the same.

*To all whom it may concern:*

Be it known that I, R. STRICKLAND, of the city of Albany, in the county of Albany, and State of New York, have invented a new and useful Improvement in Coffee and Tea-Pots; and I do hereby declare that the following is a full, clear, and exact description thereof, reference being had to the accompanying drawings, making a part of this specification, in which—

Figure 1 is a vertical central section through a coffee or tea-pot, having my improvement applied to it.

Figure 2 is a similar view of the same parts, inclined backward so as to allow the strainer to uncover the orifice of the spout.

Figure 3 is a view of the strainer and its hinge.

Similar letters of reference indicate corresponding parts in the several figures.

This invention relates to an improvement on coffee and tea-pots, and is designed to hold back the grounds or leaves in the act of pouring the liquid through the spout, and, at the same time, allow the spout to be readily and conveniently cleaned, when necessary, of all solid matters, as will be hereinafter explained.

To enable others skilled in the art to understand my invention, I will describe its construction and operation.

In the accompanying drawings—

A represents a coffee or tea-pot, which may be made of any of the well-known forms that will admit of the application of my invention.

B is the spout of the vessel A, through which liquid is poured from it; and

C is an elliptical concavo-convex strainer, which may be made of finely-perforated sheet-metal. This strainer C is applied over the orifice at the base of the spout, and attached by a hinge, *a*, to the body of the spout, inside thereof, and directly over said orifice, as shown in figs. 1 and 2.

It will be seen, by reference to figs. 1 and 2, that I apply to the concave side of the strainer C, a short distance above its lower end, a piece of metal, *b*, which will act as a weight to hold the edge of the strainer closely against the inner surface of the pot, and prevent the outward escape of solid substances with the liquid, in the act of pouring from the spout.

It will be seen that this weight C is located on one side of a vertical plane intersecting the axis of the hinge *a*, and that it necessarily acts with more or less force to keep the edge of the strainer in close contact with the side of the pot in the act of pouring out, as well as when the pot is at rest in a vertical position.

With a strainer hinged inside of a pot, substantially as described, solid substances, mixed with the liquid in such pot, will be held back in the act of pouring and when at rest, and, while this is the case, the strainer, as well as the spout, can be easily cleaned and kept clean. By shaking the pot very little, the strainer C will swing back and forth, and, by its striking against the body of the pot, it will clear itself of any matters which might have found lodgment in its interstices.

Having described my invention,

What I claim as new, and desire to secure by Letters Patent, is—

1. A coffee or tea-pot, having a strainer hinged to it inside, and applied over the orifice at the base of the spout, substantially as described.

2. The hinged strainer C, provided with a weight, *b*, operating substantially as described.

R. STRICKLAND.

Witnesses:
   G. G. DAVIDSON,
   J. H. SNOW.